United States Patent
Ota et al.

(10) Patent No.: US 6,198,478 B1
(45) Date of Patent: Mar. 6, 2001

(54) CATV TRANSMISSION CENTER APPARATUS, SUBSCRIBER TERMINAL DEVICE, CATV DISTRIBUTION SYSTEM, AND METHOD OF DISTRIBUTING PROGRAM

(75) Inventors: Masao Ota; Shigefumi Masuda; Hiroo Tamura, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/061,002

(22) Filed: Apr. 15, 1998

(30) Foreign Application Priority Data

Oct. 16, 1997 (JP) .................................................. 9-283815

(51) Int. Cl.⁷ ............................... H04N 7/10; H04N 7/14
(52) U.S. Cl. ............................... 345/327; 348/7; 348/12; 348/13
(58) Field of Search .................. 348/12, 7, 3, 1, 348/2; 455/3.1, 5.1, 4.2; 709/217, 218; 345/327

(56) References Cited

U.S. PATENT DOCUMENTS

| | | | |
|---|---|---|---|
| 4,878,245 | * 10/1989 | Bradly et al. | 380/10 |
| 4,890,320 | * 12/1989 | Monslow et al. | 380/10 |
| 4,941,040 | * 7/1990 | Pocock et al. | 358/86 |
| 5,459,506 | * 10/1995 | Bushnell | 348/7 |
| 5,606,359 | * 2/1997 | Youden et al. | 348/7 |
| 5,708,961 | * 1/1998 | Hylton et al. | 455/4.2 |
| 5,729,281 | * 3/1998 | Utsumi et al. | 348/12 |
| 5,818,438 | * 10/1998 | Howe et al. | 345/327 |
| 6,005,561 | * 12/1999 | Hawkins et al. | 345/327 |
| 6,014,693 | * 6/2000 | Ito et al. | 709/219 |

FOREIGN PATENT DOCUMENTS 7-303249  11/1995 (JP) .
8-130725   5/1996 (JP) .

* cited by examiner

*Primary Examiner*—Andrew I. Faile
*Assistant Examiner*—Kieu-Oanh Bui
(74) *Attorney, Agent, or Firm*—Helfgott & Karas, P.C.

(57) ABSTRACT

A CATV transmission center apparatus, a subscriber terminal device, a CATV distribution system, and a method of distributing a program, will solve the problems of the need to change transmission facilities for handling more channels, the costly CATV infrastructure per program, the expensive subscriber terminal devices, and the tedious and time-consuming process of selecting desired programs. When there is a request to view a program which is not being distributed from the subscriber terminal device to the CATV transmission center apparatus, an empty channel is searched for. If an empty channel is found, the requested program is distributed via the empty channel. All subscriber terminal devices are notified that the program which has started to be distributed is being distributed. The CATV transmission center apparatus distributes only those programs which are actually viewed by subscribers.

6 Claims, 11 Drawing Sheets

| CATV TRANSMIS-SION PATH SIGNAL | INDOOR TRANSMISSION PATH SIGNAL | | | |
|---|---|---|---|---|
| | ANALOG VIDEO | | DIGITAL VIDEO | |
| | SAME FREQUENCY | DIFFERENT FREQUENCIES | SAME FREQUENCY | DIFFERENT FREQUENCIES |
| ANALOG VIDEO | CIRCUIT(1) | CIRCUIT(2) | — | — |
| DIGITAL VIDEO | CIRCUIT(3) | CIRCUIT(3) | CIRCUIT(1) | CIRCUIT(2) |

CATV TRANSMISSION CENTER APPARATUS, SUBSCRIBER TERMINAL DEVICE, CATV DISTRIBUTION SYSTEM, AND METHOD OF DISTRIBUTING PROGRAM

BACKGROUND OF THE INVENTION

1. Field of the Invention

The present invention relates to a CATV (Cable Television) transmission center apparatus, a subscriber terminal device, a CATV distribution system, and a method of distributing a program, and more particularly to a CATV transmission center apparatus for transmitting programs via a CATV transmission path which is capable of bidirectional signal transmission, a subscriber terminal device for receiving programs transmitted from a CATV transmission center apparatus, a CATV distribution system which comprises a CATV transmission center apparatus and a subscriber terminal device, and a method of distributing a program, which is carried out by a CATV transmission center apparatus.

2. Description of the Related Art

In recent years, the trend in the business of CATV is toward multichannel program distribution services, and presently available CATV systems are switching from the conventional process of distributing programs in 60 channels to a new process of distributing programs in several hundreds of channels. The present invention is concerned with a technology which enables a CATV company who has been providing program distribution services with a 60-channel CATV transmission path to do services equivalent to multichannel program distribution services with the transmission facility that is presently available to the CATV.

Heretofore, it has been customary in the art of CATV program transmission to assign one program to one transmission channel.

For distributing many programs at a time, therefore, it is necessary to have as many channels as the number of programs to be distributed, and hence to maintain a transmission capacity which is large enough to accommodate those channels. To achieve more channels and larger transmission capacities, broadband transmission paths have been employed and program signals have been transmitted as digital multiplex signals.

The number of television broadcast programs that CATV companies are asked to distribute is ever increasing year after year. To meet demands for more distributed programs, CATV companies need to change the transmission facility which they presently own into a transmission facility capable of handling many channels.

The number of subscribers per optical transmission path is several hundreds at present, but tends to decrease while the number of distributed programs is increasing. In the future, it is expected that the number of subscribers per optical transmission path will be smaller than the number of distributed programs. Therefore, the number of programs which are distributed but not viewed will be increased, with the result that the cost of CATV infrastructure per program will be very high.

The multichannel program transmission requires a broadband range of frequencies, and the subscribers need to have broadband subscriber terminal devices, such as set top boxes or the like, which are dedicated to the reception of distributed CATV programs. Such broadband subscriber terminal devices add up to the cost that the subscribers have to pay to view distributed CATV programs. In addition, it is tedious and time-consuming for subscribers to select relatively few programs, which they really want to view, from many programs that are being distributed.

SUMMARY OF THE INVENTION

It is therefore an object of the present invention to provide a CATV transmission center apparatus, a subscriber terminal device, a CATV distribution system, and a method of distributing a program, which will solve the problems of the need to change transmission facilities for handling more channels, the costly CATV infrastructure per program, the expensive subscriber terminal devices, and the tedious and time-consuming process of selecting desired programs.

To achieve the above object, there is provided in accordance with the present invention a CATV transmission center apparatus for transmitting programs via a CATV transmission path which is capable of bidirectional signal transmission. The CATV transmission center apparatus comprises searching means for searching for an empty channel when there is a request to view a program which is not being distributed, from a subscriber terminal device, distributing means for distributing a program, which is requested from the subscriber terminal device, via an empty channel if such an empty channel is found by the searching means, and notifying means for notifying all subscriber terminal devices that the program which has started to be distributed by the distributing means is being distributed. The CATV transmission center apparatus also includes inspecting means for inspecting whether there is another subscriber who is viewing the program when a notification of an interruption of the viewing of the program is received from the subscriber terminal device, and distribution stopping means for stopping distributing the program and making empty the channel which has distributed the program if the inspecting means has confirmed that there is no other subscriber who is viewing the program.

According to the present invention, the above object can also be accomplished by a subscriber terminal device for receiving a program from a CATV transmission center apparatus via a CATV transmission path which is capable of bidirectional signal transmission. The subscriber terminal device comprises transmitting means for transmitting a request to view a program which is not being distributed or a notification of an interruption of the viewing of a program which has been viewed, to the CATV transmission center apparatus.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Like or corresponding parts are denoted by like or corresponding reference characters throughout views.

The principles of a CATV transmission center apparatus according to a first embodiment of the present invention will first be described below with reference to FIG. 1. According to the first embodiment, the CATV transmission center apparatus, designated by the reference numeral 2 in FIG. 1, distributes programs via a CATV transmission path 1 which is capable of bidirectional signal transmission.

The CATV transmission center apparatus 2 comprises a searching means 2a for searching for an empty channel when there is a request to view a program which is not being distributed, a subscriber terminal device 3, a distributing means 2b for distributing a program, which is requested from the subscriber terminal device 3, via an empty channel if such an empty channel is found by the searching means 2a, and a notifying means 2c for notifying all subscriber terminal devices that the program which has started to be distributed by the distributing means 2b is being distributed.

The CATV transmission center apparatus 2 also comprises an inspecting means 2d for inspecting whether there is another subscriber who is viewing the program when a notification of an interruption of the viewing of the program is received from the subscriber terminal device 3, and a distribution stopping means 2e for stopping distributing the program and making empty the channel which has distributed the program if the inspecting means 2d has confirmed that there is no other subscriber who is viewing the program.

Operation of the principles of the CATV transmission center apparatus according to the first embodiment will be described below. Even if the number of distributed programs is increased, it is not often for subscribers to view different programs, but it frequently happens for subscribers to view a few popular programs. Therefore, it is possible to distribute virtually many programs without the need for an increase in the number of channels, by distributing popular programs at all times and distributing those programs which are viewed occasionally, on request.

Figure 1:
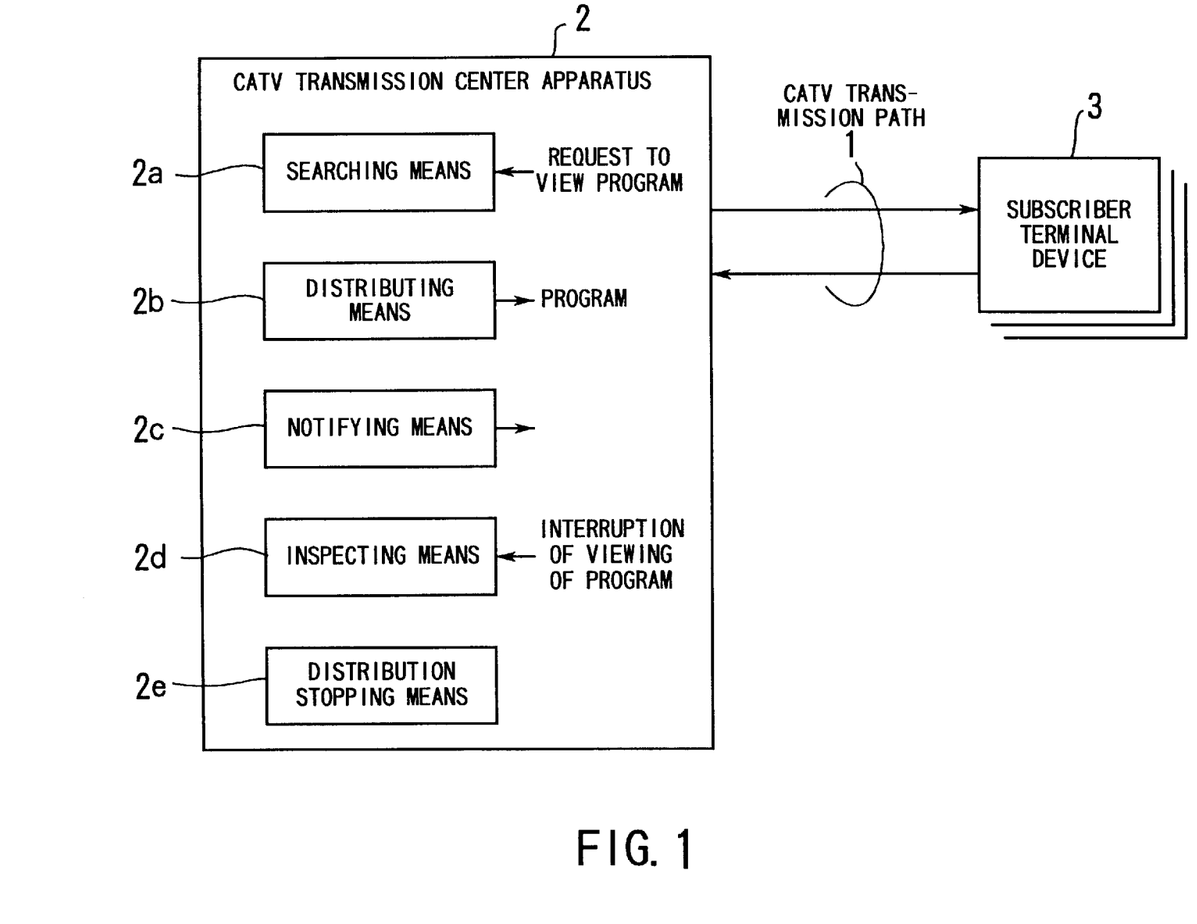
FIG. 1 is a block diagram illustrative of the principles of a CATV transmission center apparatus according to a first embodiment of the present invention.

With respect to the CATV transmission center apparatus shown in FIG. 1, the CATV transmission path 1 is capable of bidirectional signal transmission and has less channels than the programs that can be distributed by the CATV transmission center apparatus 2.

When a request to view a program that is not presently distributed by CATV transmission center apparatus 2 is sent from the subscriber terminal device 3 to the CATV transmission center apparatus 2, the searching means 2a searches for an empty channel via which no program has been distributed. If the searching means 2a has found an empty channel, the distributing means 2b distributes the program requested from the subscriber terminal device 3 via the empty channel. At the same time, the notifying means 2c notifies all subscriber terminal devices that the program which has started to be distributed by the distributing means 2b is being distributed.

In this manner, only those programs which are going to be viewed are distributed.

When a notification of an interruption of the viewing of the program is sent from the subscriber terminal device 3 to the CATV transmission center apparatus 2, the inspecting means 2d inspects whether there is another subscriber who is viewing the program. If the inspecting means 2d has confirmed that there is no other subscriber who is viewing the program, then the distribution stopping means 2e stops distributing the program and making empty the channel which has distributed the program.

In this fashion, it is possible to prevent a program which is not being viewed by anybody from being distributed and to keep an empty channel.

According to the first embodiment, the subscriber terminal device 3 has a transmitting means for transmitting a request to view a program which is not being distributed or a notification of an interruption of the viewing of a program, to the CATV transmission center apparatus 2.

In the first embodiment, as described above, even though the number of channels is not increased, it is possible to distribute more programs than channels from the CATV transmission center apparatus 2 to the subscriber terminal device 3, while avoiding the problems of the need to change transmission facilities for handling more channels, the costly CATV infrastructure per program, the expensive subscriber terminal devices, and the tedious and time-consuming process of selecting desired programs.

The first embodiment of the present invention will be described in greater detail below.

Figure 2:
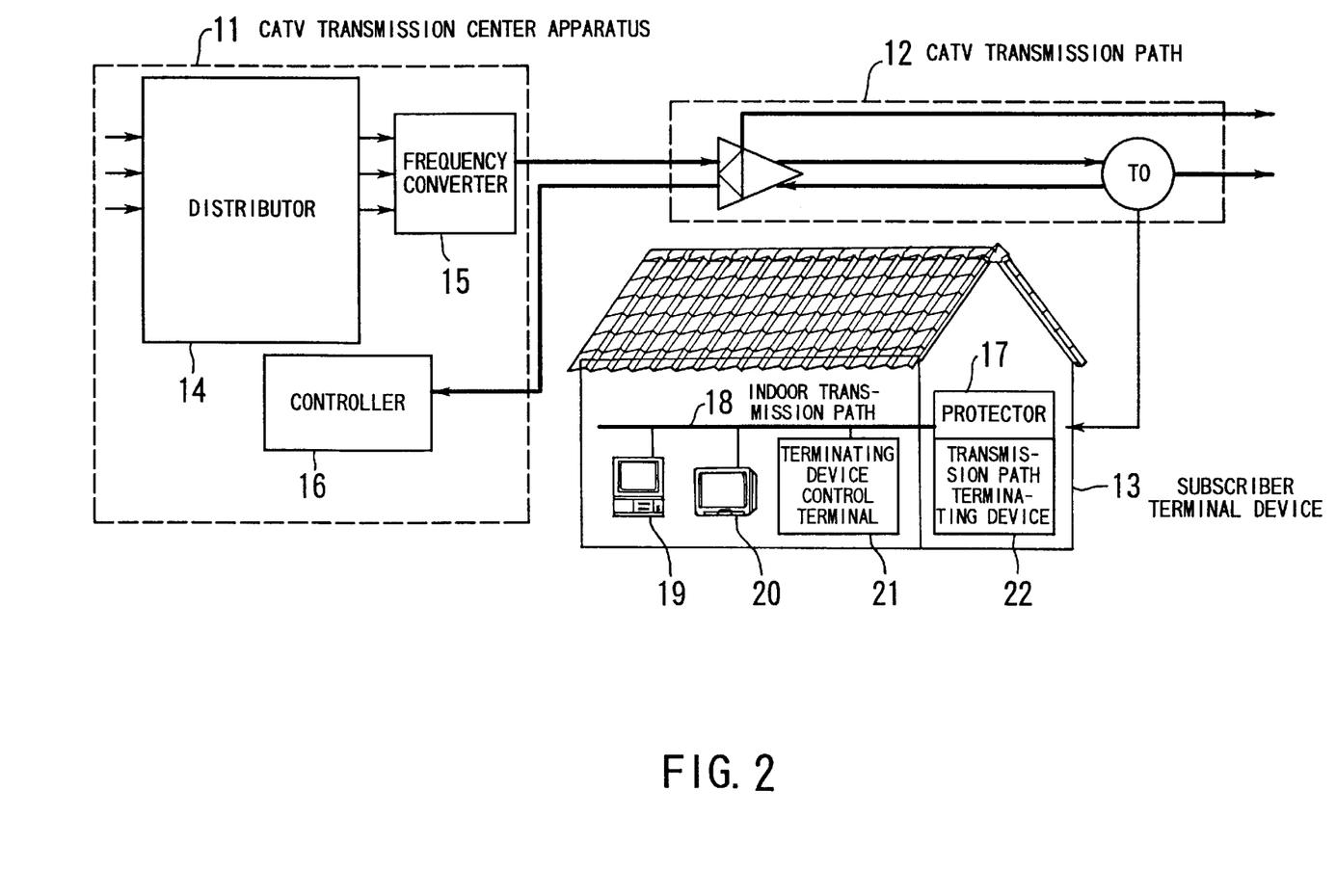
FIG. 2 is a block diagram of a CATV system which includes the CATV transmission center apparatus according to the first embodiment.

FIG. 2 shows in block form a CATV system which includes the CATV transmission center apparatus according to the first embodiment of the present invention.

The CATV system comprises a CATV transmission center apparatus 11, a CATV transmission path 12, and a subscriber terminal device 13. The CATV transmission center apparatus 11 mainly comprises a distributor 14, a frequency converter 15, and a controller 16, which will be described later on with reference to FIGS. 3 and 4. In FIG. 2, only one subscriber terminal device 13 is shown though there are many subscriber terminal devices in reality.

The subscriber terminal device 13 includes an indoor transmission path 18 connected to the CATV transmission path 12 through a protector 17. The subscriber terminal device 13 also has viewer terminals 19, 20 such as a television set, a VTR, etc., a terminating device control terminal 21, and a transmission path terminating device 22, which are all connected to the indoor transmission path 18.

The transmission path terminating device 22 serves to achieve a match between respective transmission modes in the indoor transmission path 18 and the CATV transmission path 12. The terminating device control terminal 21 transmits a request to view a program which is not being distributed and a notification of an interruption of the viewing of a program which has been viewed to the CATV transmission center apparatus 11.

Figure 3:
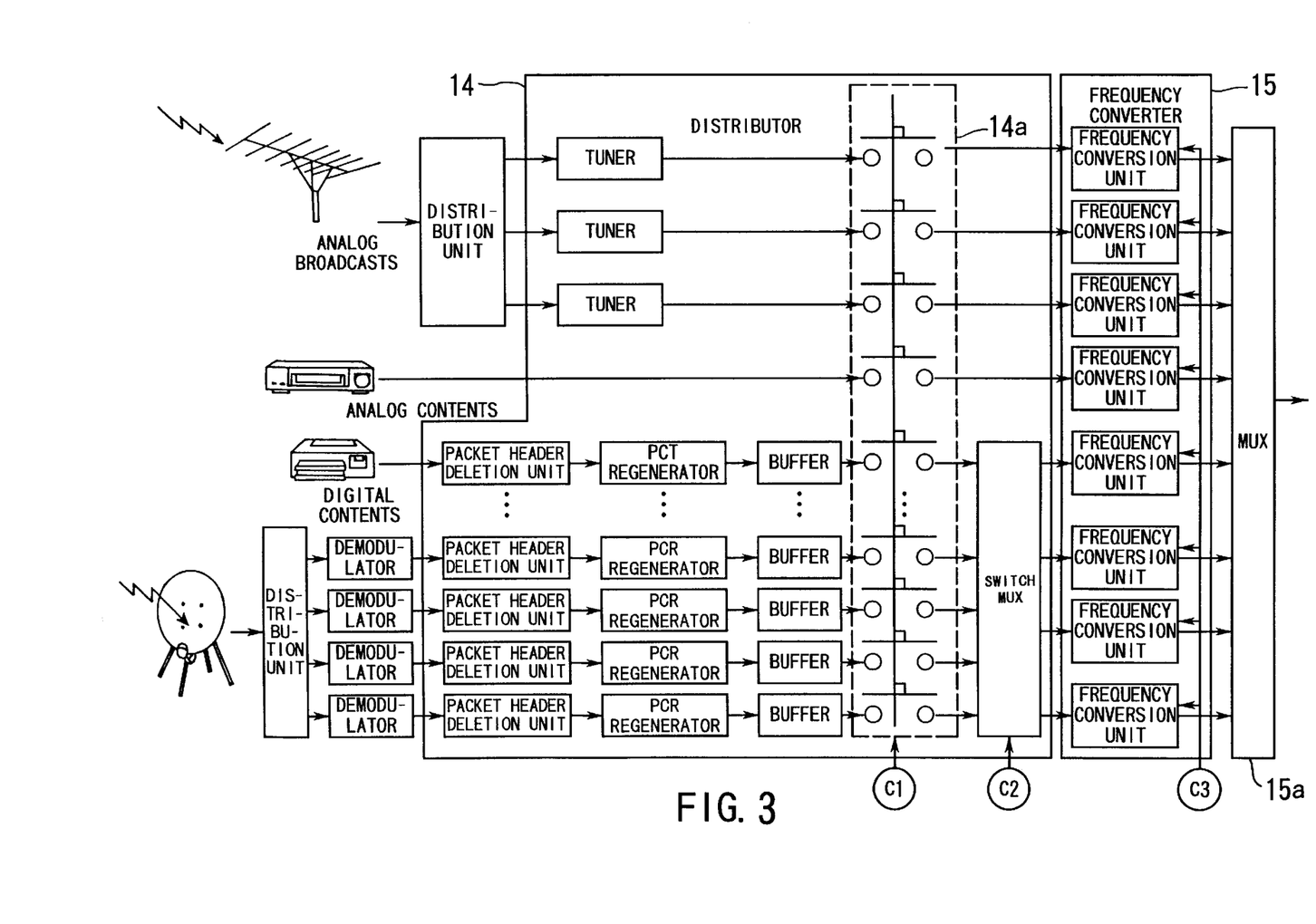
FIG. 3 is a block diagram of a portion of an internal structure of the CATV transmission center apparatus according to the first embodiment.
Figure 4:
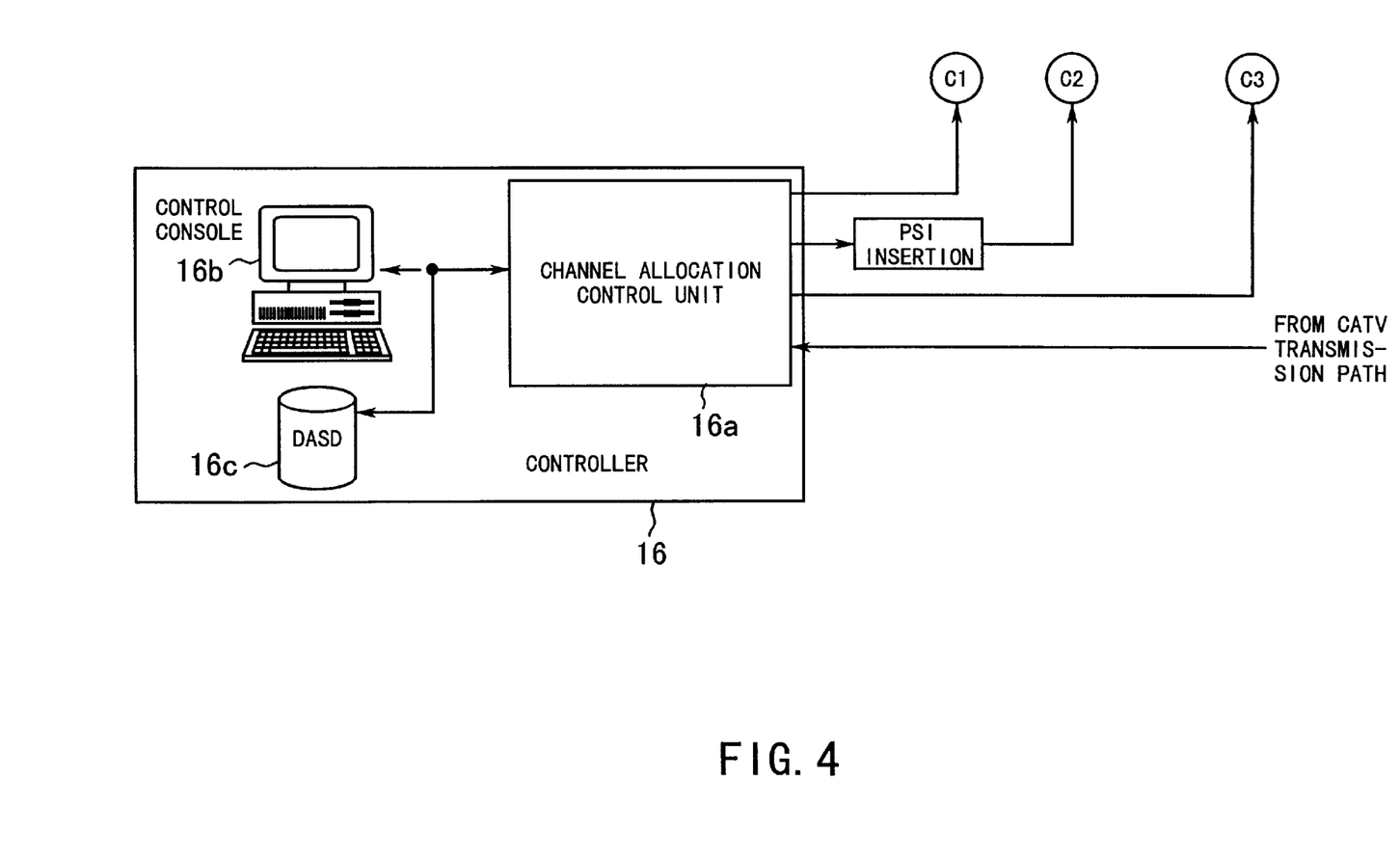
FIG. 4 is a block diagram of another portion of the internal structure of the CATV transmission center apparatus according to the first embodiment.

FIGS. 3 and 4 show an internal structure of the CATV transmission center apparatus 11.

In FIG. 3, the distributor 14 selects a maximum of as many programs as the number of channels available of the CATV transmission path 12, from broadcast television programs supplied in the form of analog signals or digital signals and contents such as privately produced programs, and programs based on telephone services, Internet services, and LAN services, and sends the selected programs to the frequency converter 15. The distributor 14 selects programs with a switch assembly 14a which is instructed by the controller 16 (see FIG. 4). If selected programs are transmitted in the form of digital signals, then the distributor 14 reconstructs a plurality of programs contained in one transmission carrier. PCR (Program Clock Reference) regenerators in the distributor 14 regenerate PCR information for setting and calibrating an STC (System Time Clock) value, which serves as a time reference, to a value intended in an MPEG system encoder, in an MPEG system decoder.

The frequency converter 15 converts the frequencies of the programs sent from the distributor 14 into transmission path frequencies allotted by settings from the controller 16. The converted program frequencies are then multiplexed by a multiplexer (MUX) 15a. Since the frequency converter 15 allocates the same frequencies as the present television broadcasting frequencies in ranges of 6 MHz, the equipment used by the CATV transmission path 12 and the subscribers does not need to be changed.

The controller 16 comprises a channel allocation control unit 16a, a control console 16b, and a mass storage device (DASD: Direct Access Storage Device) 16c. The channel allocation control unit 16a controls the distributor 14 and the frequency converter 15 according to settings from the control console 16b or a distribution request sent from the terminating device control terminal 21. When distributed programs are changed, the channel allocation control unit 16a transmits changed details as PSI (Program Specific Information) through a downstream control signal channel to the subscriber terminal devices. The channel allocation control unit 16a comprises a processor including a CPU, a ROM, a RAM, etc. Details of a processing sequence carried out by the processor as the channel allocation control unit 16a will be described later on with reference to FIGS. 7 and 8.

The mass storage device 16c stores data representative of programs viewed by the subscribers and program distribution requests from the subscribers. The data stored in the mass storage device 16c will be used to allocate channels and charge the subscribers.

Figure 5:
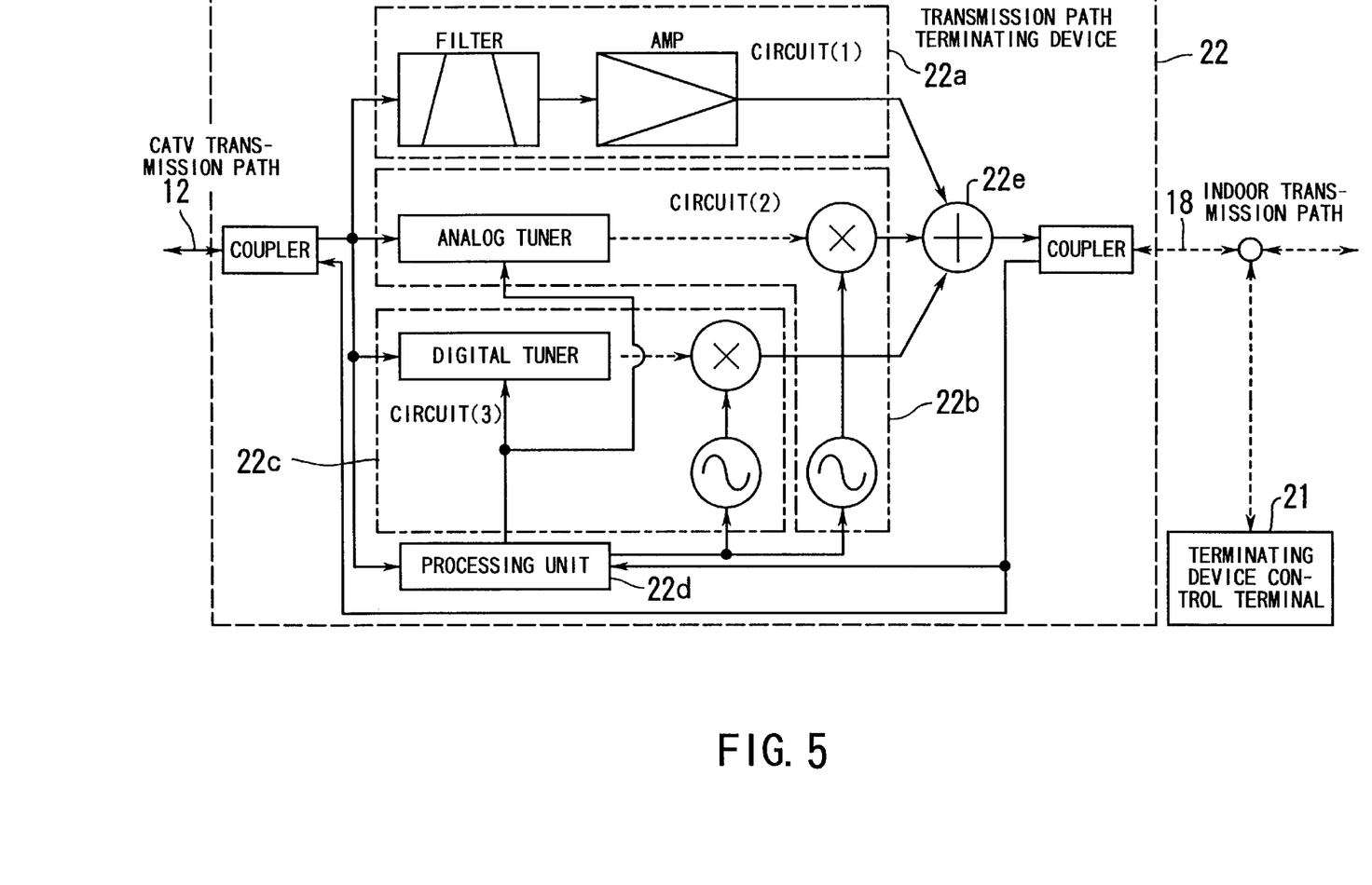
FIG. 5 is a block diagram of an internal structure of a transmission path terminating device in a subscriber terminal device.

FIG. 5 shows an internal structure of the transmission path terminating device 22. As shown in FIG. 5, the transmission path terminating device 22 has circuits 22a, 22b, 22c, and an adder 22e for converting the arrangement of channels for various signals transmitted from the CATV transmission path 12 so as to match the arrangement of channels in the indoor transmission path 18. Specifically, the CATV transmission center apparatus 11 classifies programs to be distributed to subscribers into programs that are to be distributed via fixed channels and programs that are to be distributed via floating channels. Popular programs that are highly likely to be viewed are allotted certain fixed channels at all times, which are associated with certain fixed frequencies in the CATV transmission path 12. Other programs are not allotted certain fixed channels, but are allotted empty channels selected from floating channels according to program viewing requests and distributed via the allotted channels.

Since the arrangement of frequencies for transmitting programs varies in the CATV transmission path 12 at all times because of such an allocation of channels to programs, it is necessary to convert the arrangement of channels in the CATV transmission path 12 into a fixed arrangement of channels in the indoor transmission path 18.

The transmission path terminating device 22 has a processing unit 22d which receives a signal from the terminating device control terminal 21 or the channel allocation control unit 16a, stores the received signal, and controls the conversion of the arrangement of channels in the circuits 22b, 22c. When a subscriber contracts the CATV company for viewing the fixed channels and also viewing a certain number of channels among the floating channels, the processing unit 22d holds the number of programs that the subscriber can view. The processing unit 22d controls an analog tuner in the circuit 22b and a digital tuner in the circuit 22c to descramble programs within the contracted number of programs, and to transmit the descrambled programs to the indoor transmission path 18. If a PPV (Pay Per View) program is distributed, then the processing unit 22d holds charging information, and sends the charging information to the CATV transmission center apparatus 11. The processing unit 22d comprises a processor including a CPU, a ROM, a RAM, etc. Details of a processing sequence carried out by the processor as the processing unit 22d will be described later on with reference to FIGS. 7 and 8.

The subscriber operates the terminating device control terminal 21 to select and set up programs that the subscriber wants to see, within the contracted number of programs. The information of the programs thus selected and set up is sent from the terminating device control terminal 21 to the channel allocation control unit 16a. The terminating device control terminal 21 comprises a processor including a CPU, a ROM, a RAM, etc.

Figure 6:
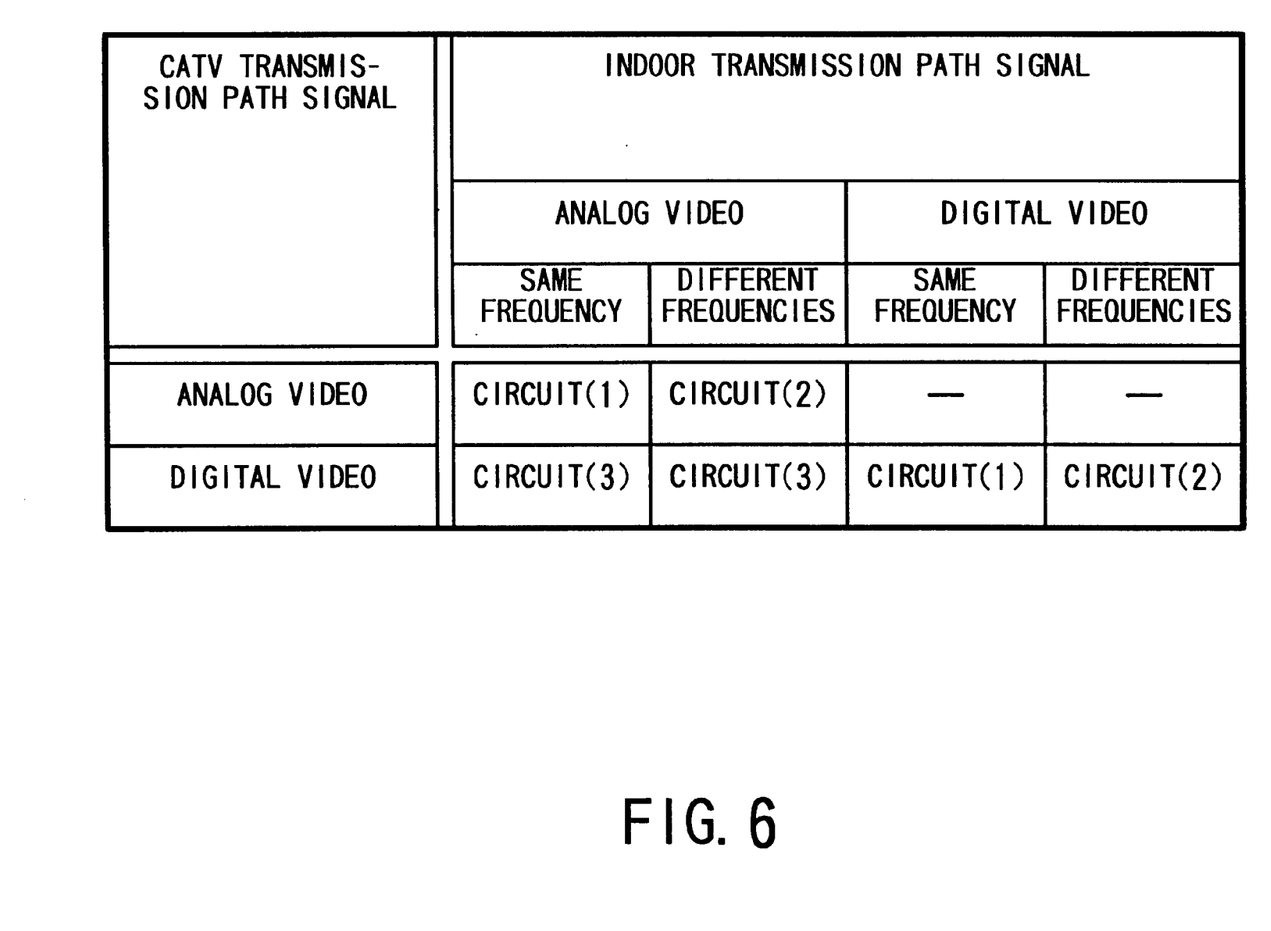
FIG. 6 is a diagram showing patterns in which three circuits are used depending on the type of a signal in a CATV transmission path and the type of a signal in an indoor transmission path.

FIG. 6 shows patterns in which the circuit 22a (1), the circuit 22b (2), and the circuit 22c (3) are used depending on the type of a signal in the CATV transmission path 12 and the type of a signal in the indoor transmission path 18. If the signal in the CATV transmission path 12 and the signal in the indoor transmission path 18 are in the same frequency space and also in the same sign space, i.e., if both the signals are analog signals or digital signals, then the circuit 22a filters out an unwanted frequency band and sends the received signal directly to the indoor transmission path 18. If the signal in the CATV transmission path 12 and the signal in the indoor transmission path 18 are in different frequency spaces and in the same sign space, then the circuit 22b converts the frequency of the received signal into an intermediate frequency with the analog tuner, thereafter converts the intermediate frequency into the frequency space of the indoor transmission path 18, and sends the signal to the indoor transmission path 18. If the signal in the CATV transmission path 12 and the signal in the indoor transmission path 18 are in different sign spaces, i.e., if a digital image signal is to be received as an analog image signal by the indoor transmission path 18, then the circuit 22c converts the digital image signal into an analog image signal with the digital tuner, converts the intermediate frequency into the frequency space of the indoor transmission path 18, and sends the signal to the indoor transmission path 18. The circuits 22a, 22b, 22c are incorporated as required into the transmission path terminating device 22.

Figure 7:
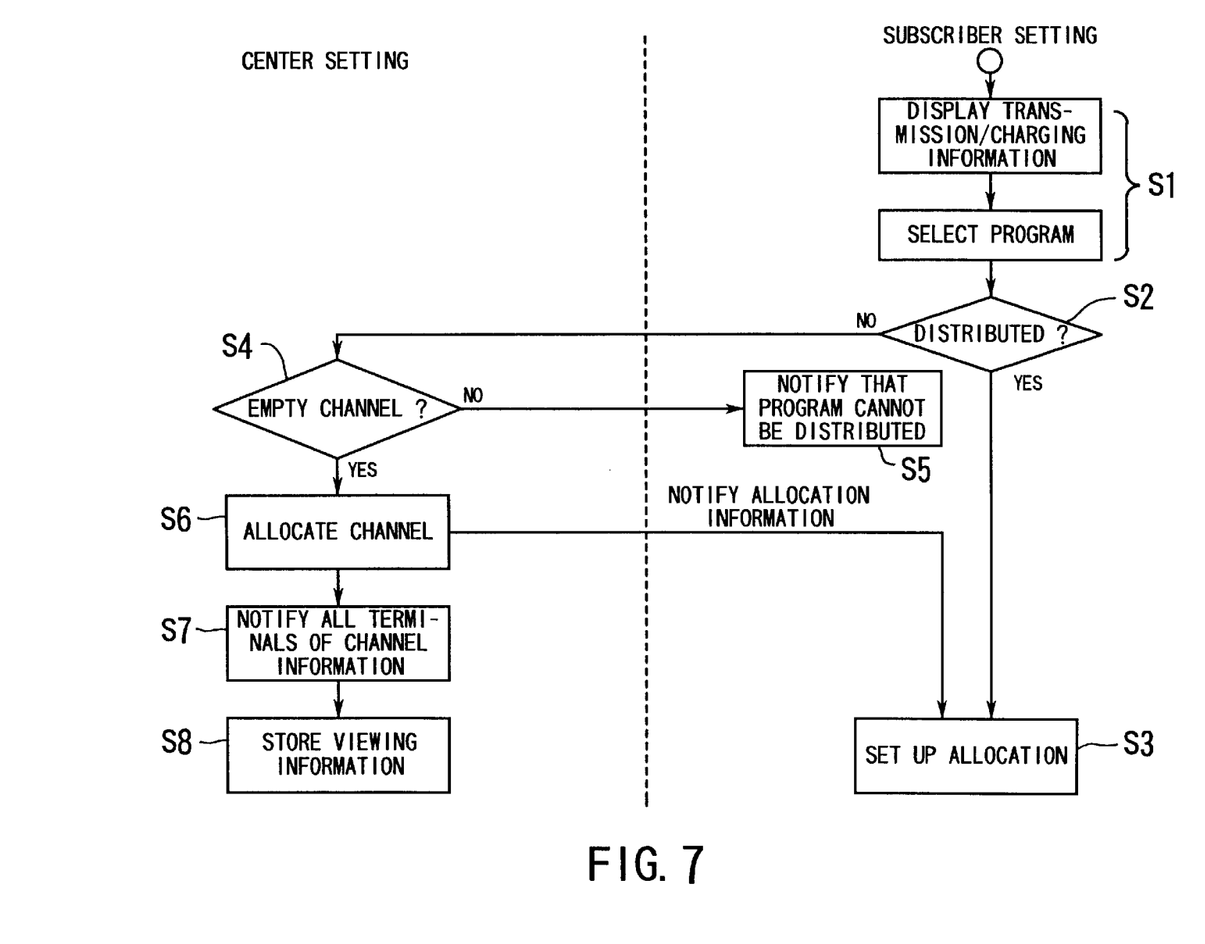
FIG. 7 is a flowchart of a processing sequence which is carried out by a channel allocation control unit in a controller in the CATV transmission center apparatus and a processing sequence which is carried out by a processing unit in the transmission path terminating device and a terminating device control terminal in a subscriber terminal device.

FIG. 7 shows a processing sequence which is carried out by the channel allocation control unit 16a in the controller 16 in the CATV transmission center apparatus 11 and a processing sequence which is carried out by the processing unit 22d in the transmission path terminating device 22 and the terminating device control terminal 21 in the subscriber terminal device 13. In particular, FIG. 7 shows a procedure for setting up program allocations. Numerals with a prefix S in FIG. 7 represent step numbers.

The subscriber sees transmission/charging information displayed on either one of the viewer terminals 19, 20 and selects a program within the contracted number of programs in a step S1, and then enters the selected program into the terminating device control terminal 21. The terminating device control terminal 21 transmits information of the selected program to the processing unit 22d in the transmission path terminating device 22. The transmission/charging information includes a list of programs that can be distributed and charging information for those programs.

The processing unit 22d determines whether the selected program has already been distributed to the transmission path terminating device 22 in a step S2. If the selected program has already been distributed, then the processing unit 22d sets up the program in a step S3. If the selected program has not been distributed, then the processing unit 22d notifies the terminating device control terminal 21 that the selected program has not been distributed. The terminating device control terminal 21 sends a request to distribute the program to the channel allocation control unit 16a in the controller 16 in the CATV transmission center apparatus 11.

The channel allocation control unit 16a checks if there is an empty channel via which no program is being distributed in the distributor 14 in a step S4. If there is no empty channel, then the channel allocation control unit 16a notifies the subscriber terminal device 13 that the program requested to be distributed cannot be distributed in a step S5. If there is an empty channel, then the channel allocation control unit 16a establishes a setting for the distributor 14 to distribute the requested program via the empty channel, and notifies the subscriber terminal device 13 that the setting to distribute the requested program has been established in a step S6.

The channel allocation control unit 16a then notifies the transmission path terminating devices and the terminating device control terminals of all the subscriber terminal devices, of the newly set-up program and the channel via which the program is being transmitted in a step S7. The channel allocation control unit 16a stores the title of the newly distributed program and the name of the subscriber terminal device which is viewing the program in a step S8.

Figure 8:
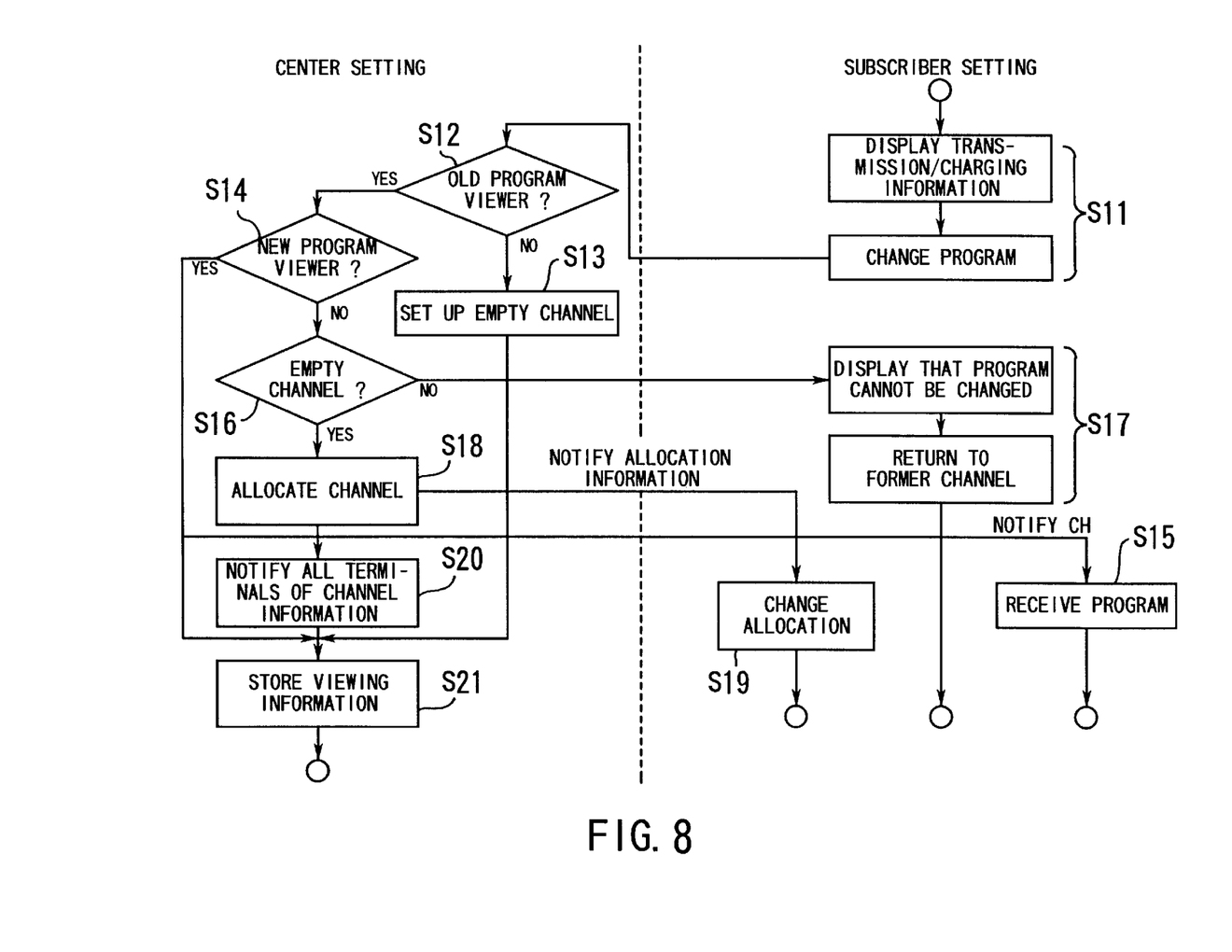
FIG. 8 is a flowchart of a process for changing a program allocation setting when a subscriber cancels a program which has been viewed so far and selects a new program.

FIG. 8 also shows a processing sequence which is carried out by the channel allocation control unit 16a in the controller 16 in the CATV transmission center apparatus 11 and a processing sequence which is carried out by the processing unit 22d in the transmission path terminating device 22 and the terminating device control terminal 21 in the subscriber terminal device 13. In particular, FIG. 8 illustrates a procedure for changing a program allocation setting when a subscriber cancels a program which has been viewed so far and selects a new program. Numerals with a prefix S in FIG. 8 represent step numbers.

The subscriber sees transmission/charging information displayed on either one of the viewer terminals 19, 20 and operates the terminating device control terminal 21 to cancel a program which has been viewed so far and selects a new program in a step S11. The terminating device control terminal 21 transmits information of the program which has been viewed so far and the newly selected program to the processing unit 22d in the transmission path terminating device 22.

The processing unit 22d refers to data stored in the mass storage device 16c to check if the program which has been viewed so far (hereinafter also referred to as an "old program") is being viewed by another subscriber in a step S12. If there is no subscriber who is viewing the old program, then the processing unit 22d stops distributing the old program, and sets up the channel which has distributed the old program as an empty channel in a step S13. The name of the subscriber terminal device which has been marked as viewing the old program is deleted from the mass storage device 16c in a step S21.

If there is a subscriber who is viewing the old program, then control goes to a step S14 in which the processing unit 22d refers to data stored in the mass storage device 16 to check if the newly selected program is being viewed by another subscriber. If there is a subscriber who is viewing the new program, then the processing unit 22d notifies the transmission path terminating device 22 in the subscriber terminal device 13 of the channel for distributing the new program, prompting the subscriber terminal device 13 to receive the new program in a step S15. The processing unit 22d stores the name of the subscriber terminal device 13 which views the new program in the mass storage device 16c in the step S21.

If there is no subscriber who is viewing the new program, then the channel allocation control unit 16a checks if there is an empty channel via which no program is being distributed in the distributor 14 in a step S16. If there is no empty channel, then the channel allocation control unit 16a notifies the subscriber terminal device 13 that the program requested to be distributed cannot be distributed in a step S17. If there is an empty channel, then the channel allocation control unit 16a establishes a setting for the distributor 14 to distribute the requested program via the empty channel, and notifies the subscriber terminal device 13 of the channel for distributing the new program in a step S18. The processing unit 22d receives the program via the notified channel in a step S19.

The channel allocation control unit 16a notifies the transmission path terminating devices and the terminating device control terminals of all the subscriber terminal devices, of the newly set-up program and the channel via which the program is being transmitted in a step S20. The channel allocation control unit 16a stores, in the mass storage device 16c, the title of the newly distributed program and the name of the subscriber terminal device which is viewing the program in the step S21.

An allocation of a program to a channel may be set up and changed by the CATV transmission center apparatus 11. Specifically, the control console 16b of the controller 16 may display empty channels and the numbers of subscriber terminal devices for respective programs, and the operator of the CATV transmission center apparatus 11 may allocate a program to a channel and change the allocation while referring to the displayed information.

The channel allocation control unit 16a refers to data stored in the mass storage device 16c, and calculates the percentages of subscribers who are watching programs from the stored titles of the programs and the names of the subscriber terminal devices which are viewing the programs. Based on the calculated percentages, the channel allocation control unit 16a sets up lower charges for programs with higher percentages and higher charges for programs with lower percentages. The information thus set up is transmitted to all the subscriber terminal devices for thereby inviting subscribers to view programs with higher percentages. As a result, the problem of insufficient empty channels in the CATV transmission path 12 is eliminated, and the number transmission path channels that can be allocated can be increased.

As described above, the number of programs that can be viewed by a subscriber is limited, and only those programs which are requested to be distributed by subscribers are distributed in principle. Therefore, the CATV transmission path 12 is not required to have as many channels as the number of programs which can be distributed by the CATV transmission center apparatus 11, and hence does not need to maintain a large transmission capability. The number of channels that should be made available is represented by (the contracted number of programs per subscriber×the number of subscribers) at maximum. However, since a certain few programs are actually popular among the subscribers, most requests to view programs can be covered by several tens of channels.

A CATV transmission center apparatus according to a second embodiment of the present invention will be described below.

The CATV transmission center apparatus according to the second embodiment is basically of the same structure as the CATV transmission center apparatus according to the first embodiment. Only those details of the CATV transmission center apparatus according to the second embodiment which are different from those of the CATV transmission center apparatus according to the first embodiment will be described below.

Figure 9:
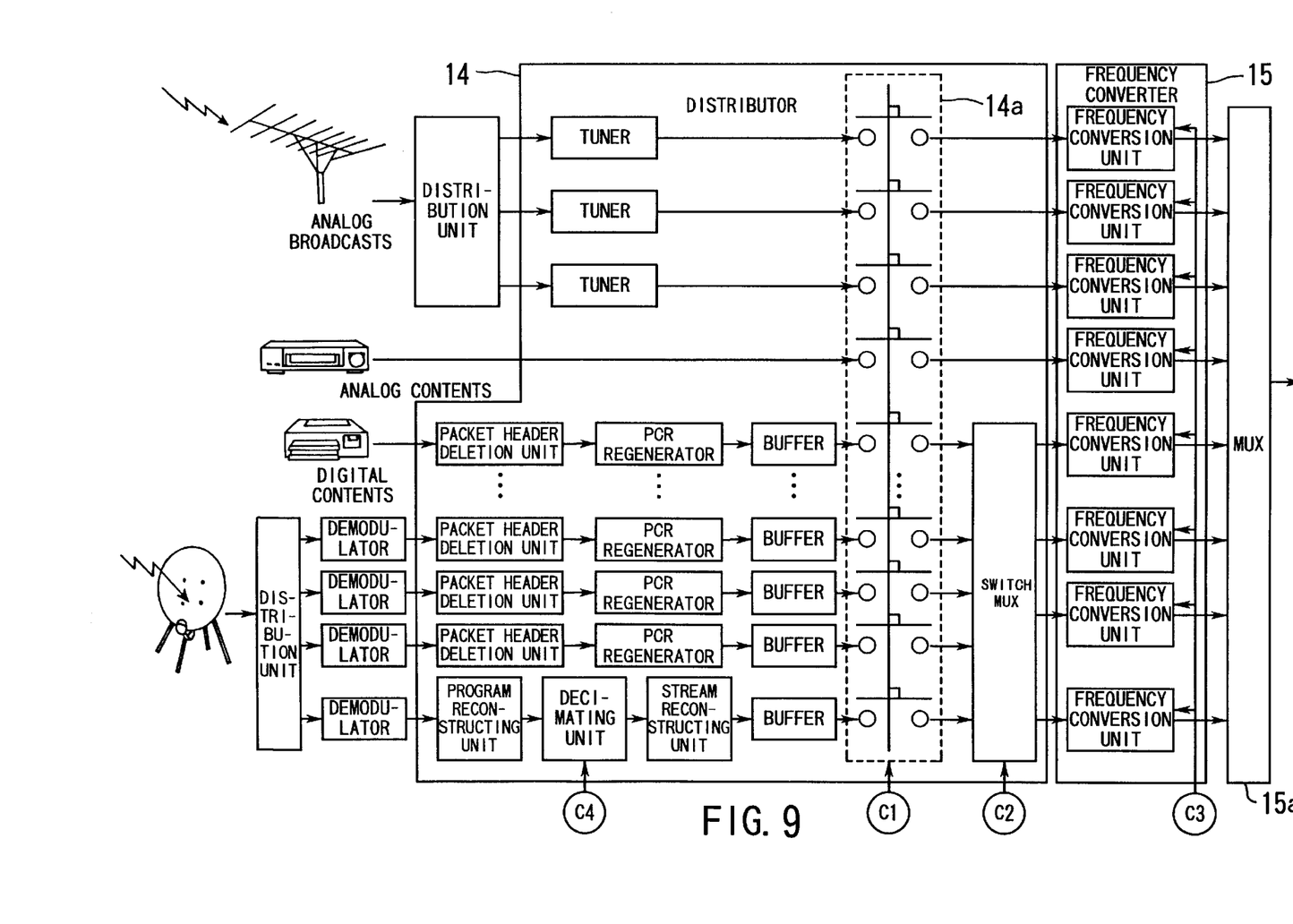
FIG. 9 is a block diagram of a portion of an internal structure of a CATV transmission center apparatus according to a second embodiment of the present invention.
Figure 10:
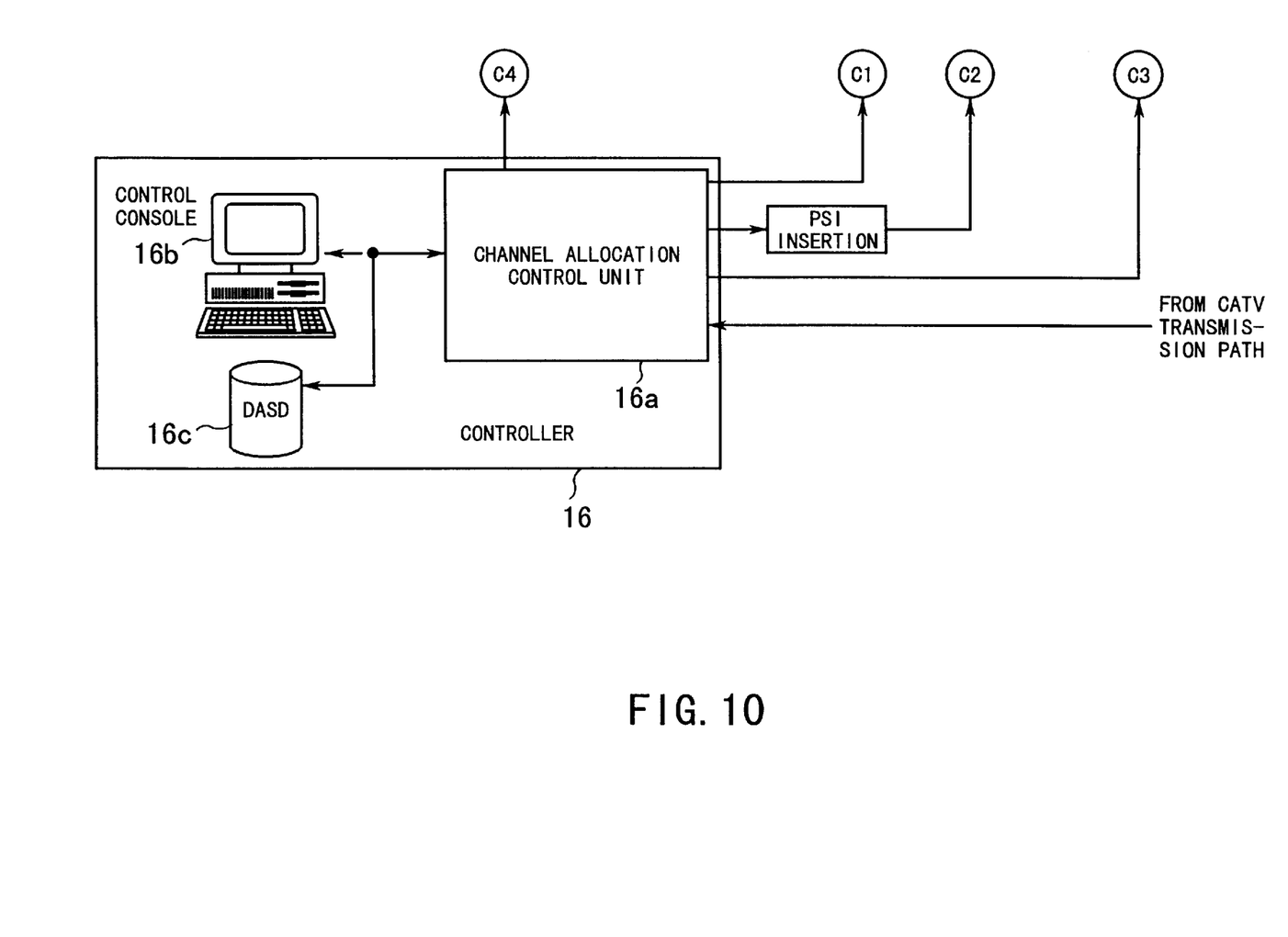
FIG. 10 is a block diagram of another portion of the internal structure of the CATV transmission center apparatus according to the second embodiment.

FIGS. 9 and 10 show an internal structure of the CATV transmission center apparatus according to the second embodiment of the present invention.

According to the second embodiment, a distributor 14 differs from the distributor 14 according to the first embodiment with respect to an circuit section for handling digital broadcast signals, and additionally has functions including a program reconstructing unit, a decimating unit, and a stream reconstructing unit. The decimating unit is controlled by a channel allocation control unit 16a in a controller 16.

In the first embodiment, an empty channel is searched for, and if there is no empty channel, a program which is requested to be distributed is not distributed (see the steps S4, S5 in FIG. 7 and the steps S16, S17 in FIG. 8). In the second embodiment, however, when there is no empty channel, the quality of images in a certain program is lowered to reduce the transmission bit rate for distributing a program which is requested to be distributed. The certain program referred to above is a program which is distributed in the form of a digital signal and is viewed by a relatively low percentage of subscribers.

Figure 11:
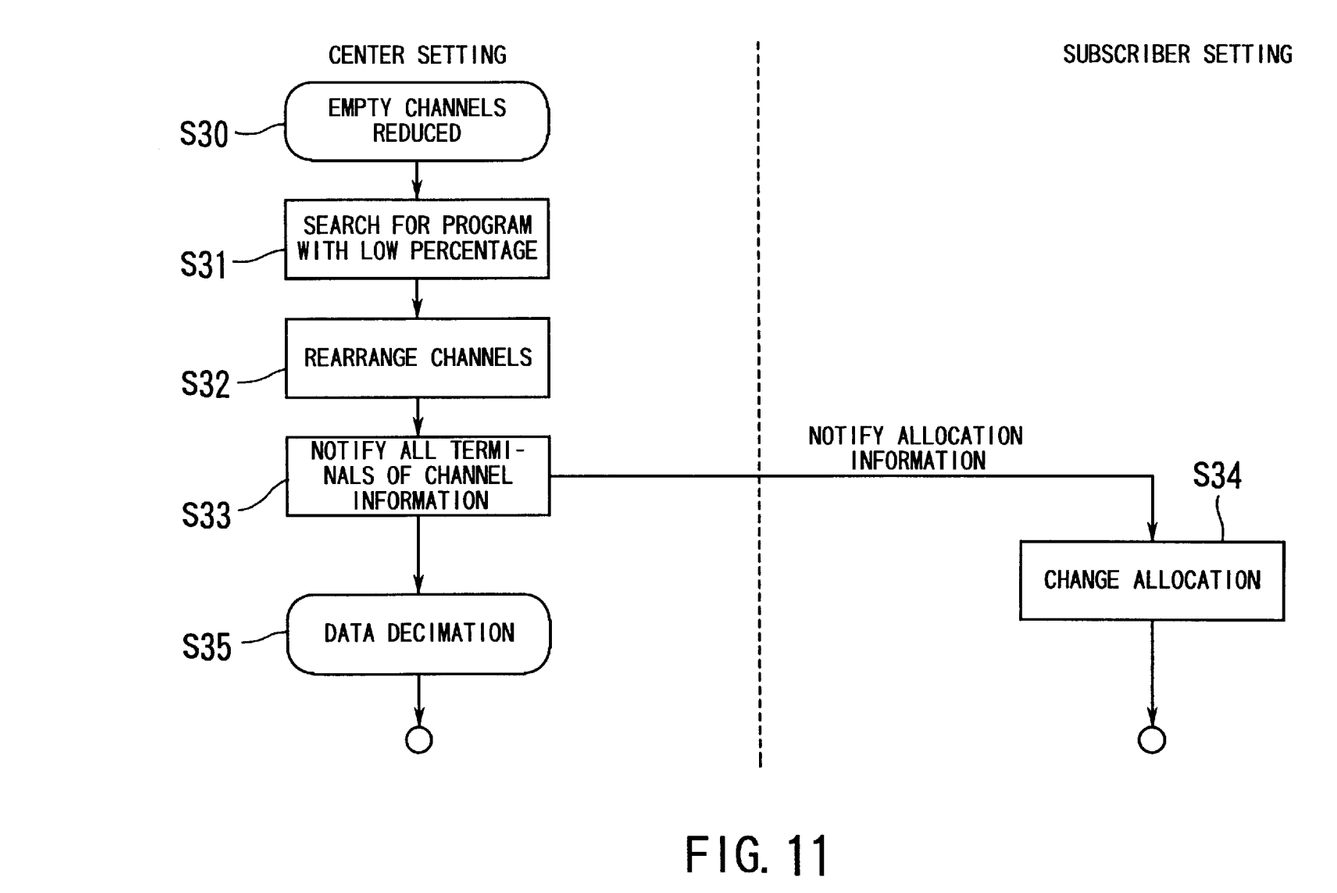
FIG. 11 is a flowchart of a processing sequence which is carried out by a channel allocation control unit and a processing unit in the CATV transmission center apparatus according to the second embodiment.

FIG. 11 shows a processing sequence which is carried out by the channel allocation control unit 16a and the processing unit 22d in the CATV transmission center apparatus according to the second embodiment. The processing sequence shown in FIG. 11 applies to channels for transmitting digital broadcasts. Numerals with a prefix S in FIG. 11 represent step numbers.

Normally, a transmission rate of 6 Mbps is required to transmit digital broadcasts. In the transmission of digital broadcasts, it is possible to multiplex, five or six times, the usual data in the bandwidth of 6 MHz. The CATV transmission center apparatus according to the second embodiment is based on this principle.

If the number of requests to distribute programs increases and not enough channels are available to meet those requests in a step S30, then the percentages of subscribers who are viewing programs are detected. Specifically, the channel allocation control unit 16a refers to data stored in the mass storage device 16c, and calculates the percentages of subscribers who are watching programs from the stored titles of the programs and the names of the subscriber terminal devices which are viewing the programs. Then, the program with the lowest percentage is detected in a step S31. Though only one program may be detected, several programs may be detected to minimize a degradation of the quality of images in the programs which will be caused by subsequently reducing the amount of data.

If the detected programs have been distributed so far in the form of analog signals, then the channel allocation control unit 16a changes the arrangement of the channels for the programs so that the programs will be distributed in channels by way of digital signals in a step S32. For changing the arrangement of the channels, care should be taken to transmit programs of small amounts of data with the same digital signal. Then, the amount of data of programs with lower percentages is reduced, thereby increasing the number of times that the programs are multiplexed with digital signals in a step S35. The amount of data of programs may be reduced by simple decimation at a packet level, reduction in the number of frames (decimation of motions), reduction in the resolution (reduction in the density of information), etc.

The channel allocation control unit 16a establishes a setting for the distributor 14 to distribute a requested program via an empty channel thus produced. The channel allocation control unit 16a then notifies information of a changed allocation of the channel to the program to all the subscriber terminal devices in a step S33. The processing units in the transmission path terminating device in all the subscriber terminal devices changes a channel allocation according to the notified information in a step S34.

In the second embodiment, as described above, the amount of transmitted information is reduced on the basis of the principles of digital broadcasts to increase the number of times that programs are multiplexed, for thereby creating an empty channel. Therefore, it is possible to meet a request to distribute a program in situations where no empty channel is available in the first embodiment.

With the present invention, as described above, when there is a request to view a program from the subscriber terminal device, the CATV transmission center apparatus searches for an empty channel, and distributes the requested program via the empty channel. Specifically, even if the number of distributed programs is increased, it is not often for subscribers to view different programs, but it frequently happens for subscribers to view a few popular programs. Therefore, it is possible to distribute virtually many programs without the need for an increase in the number of channels, by distributing popular programs at all times and distributing those programs which are viewed occasionally, on request.

According to the present invention, even though the number of channels is not increased, it is possible to distribute more programs than channels from the CATV transmission center apparatus to the subscriber terminal device, while avoiding the problems of the need to change transmission facilities for handling more channels, the costly CATV infrastructure per program, the expensive subscriber terminal devices, and the tedious and time-consuming process of selecting desired programs.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A CATV transmission center apparatus for transmitting programs via a CATV transmission path which is capable of bidirectional signal transmission, comprising:

searching means for searching for an empty channel when there is a request to view a program which is not being distributed, from a subscriber terminal device;

first distributing means for distributing a program, which is requested from said subscriber terminal device, via an empty channel if such an empty channel is found by said searching means;

notifying means for notifying all subscriber terminal devices that the program which has started to be distributed by said first distributing means is being distributed;

percentage detecting means for detecting percentages of subscribers who are viewing programs;

lowest-percentage program distributing means for distributing, in a channel by way of a digital signal, a program with a lowest percentage detected by said percentage detecting means, and reducing the amount of data of the program, if no empty channel is found by said searching means; and second distributing means for distributing the program requested from said subscriber terminal device via a channel which is made empty by the program distributed by way of the digital signal by said lowest-percentage program distributing means.

2. A CATV transmission center apparatus according to claim 1, further comprising:

high-percentage program distributing means for distributing, in advance, a program which is highly likely for subscribers to view.

3. A CATV transmission center apparatus comprising;

searching means for searching for an empty channel when there is a request to view a program which is not being distributed, from a subscriber terminal device;

first distributing means for distributing a program, which is requested from said subscriber terminal device, via an empty channel if such an empty channel is found by said searching means;

percentage detecting means for detecting percentages of subscribers who are viewing programs;

lowest-percentage program distributing means for distributing, in a channel by way of a digital signal, a program with a lowest percentage detected by said percentage detecting means, and reducing the amount of data of the program, if no empty channel is found by said searching means;

second distributing means for distributing the program requested from said subscriber terminal device via a channel which is made empty by the program distributed by way of the digital signal by said lowest-percentage program distributing means;

notifying means for notifying all subscriber terminal devices that the program which has started to be distributed by said first distributing means is being distributed;

inspecting means for inspecting whether there is another subscriber who is viewing the program when a notification of an interruption of the viewing of the program is received from the subscriber terminal device; and distribution stopping means for stopping distributing the program and making empty the channel which has distributed the program if said inspecting means has confirmed that there is no other subscriber who is viewing the program.

4. A CATV transmission center apparatus according to claim 1, further comprising:

charging means for setting up lower charges for programs with higher percentages and higher charges for programs with lower percentages, based on the percentages detected by said percentage detecting means.

5. A CATV distribution system for distributing a program from a CATV transmission center apparatus to a subscriber terminal device via a CATV transmission path which is capable of bidirectional signal transmission, comprising:

transmitting means, disposed in the subscriber terminal device, for transmitting a request to view a program which is not being distributed or a notification of an interruption of the viewing of a program which has been viewed, to the CATV transmission center apparatus;

searching means, disposed in the CATV transmission center apparatus, for searching for an empty channel when there is a request to view a program which is not being distributed, from said transmitting means;

first distributing means, disposed in the CATV transmission center apparatus, for distributing a program, which is requested from said subscriber terminal device, via an empty channel if such an empty channel is found by said searching means;

notifying means, disposed in the CATV transmission center apparatus, for notifying all subscriber terminal devices that the program which has started to be distributed by said distributing means is being distributed;

percentage detecting means for detecting percentages of subscribers who are viewing programs;

lowest-percentage program distributing means for distributing, in a channel by way of a digital signal, a program with a lowest percentage detected by said percentage detecting means, and reducing the amount of data of the program, if no empty channel is found by said searching means;

second distributing means for distributing the program requested from said subscriber terminal device via a channel which is made empty by the program distributed by way of the digital signal by said lowest percentage program distributing means;

inspecting means, disposed in the CATV transmission center apparatus, for inspecting whether there is another subscriber who is viewing the program when a notification of an interruption of the viewing of the program is received from said transmitting means; and distribution stopping means, disposed in the CATV transmission center apparatus, for stopping distributing the program and making empty the channel which has distributed the program if said inspecting means has confirmed that there is no other subscriber who is viewing the program.

6. A method of distributing a program in a CATV transmission center apparatus for transmitting programs to a subscriber terminal device via a CATV transmission path which is capable of bidirectional signal transmission, comprising the steps of:

searching for an empty channel when there is a request to view a program which is not being distributed, from the subscriber terminal device;

distributing a program, which is requested from said subscriber terminal device, via an empty channel if such an empty channel is found;

notifying all subscriber terminal devices that the program which has started to be distributed is being distributed;

detecting percentages of subscribers who are viewing programs;

re-distributing a program with a lowest percentage detected by the detecting step, in a channel by way of a digital signal, and reducing the amount of data of the program, if no empty channel is found by the searching step;

distributing the program requested from said subscriber terminal device via a channel which is made empty by the program distributed by way of the digital signal by the re-distributing step;

inspecting whether there is another subscribed who is viewing the program when a notification of an interruption of the viewing of the program is received from the subscriber terminal device; and stopping distributing the program and making empty the channel which has distributed the program if it has been confirmed that there is no other subscriber who is viewing the program.

* * * * *